US008041832B2

(12) United States Patent
Hughes, Jr. et al.

(10) Patent No.: US 8,041,832 B2
(45) Date of Patent: Oct. 18, 2011

(54) NETWORK DATA DISTRIBUTION SYSTEM AND METHOD

(75) Inventors: George Louis Hughes, Jr., Wesley Chapel, FL (US); Craig Reding, Midland Park, NY (US)

(73) Assignee: Verizon Services Corp., Ashburn, VA (US)

( * ) Notice: Subject to any disclaimer, the term of this patent is extended or adjusted under 35 U.S.C. 154(b) by 1613 days.

(21) Appl. No.: 11/122,602

(22) Filed: May 5, 2005

(65) Prior Publication Data

US 2006/0271617 A1 Nov. 30, 2006

(51) Int. Cl.
*G06F 15/173* (2006.01)
(52) U.S. Cl. ............ 709/232; 725/65; 725/66; 725/121; 709/219; 709/227
(58) Field of Classification Search .................. 709/232, 709/239
See application file for complete search history.

(56) References Cited

U.S. PATENT DOCUMENTS

| | | | |
|---|---|---|---|
| 5,790,753 A | | 8/1998 | Krishnamoorthy et al. |
| 6,091,757 A | * | 7/2000 | Cudak et al. .................. 375/130 |
| 6,144,402 A | * | 11/2000 | Norsworthy et al. ......... 725/109 |
| 6,317,831 B1 | | 11/2001 | King |
| 6,543,005 B1 | | 4/2003 | Bamford |
| 6,963,993 B1 | * | 11/2005 | Semancik et al. ................ 714/2 |
| 2003/0018719 A1 | * | 1/2003 | Ruths et al. .................... 709/205 |
| 2003/0137536 A1 | | 7/2003 | Hugh |
| 2005/0273822 A1 | * | 12/2005 | Snell et al. ...................... 725/64 |

FOREIGN PATENT DOCUMENTS

WO WO03/041397 5/2003

OTHER PUBLICATIONS

RFC 793, "Transmission Control Protocol Darpa Internet Program Protocol Specification", University of Southern California. pp. 1-10.*
Extended European Search Report issued on Mar. 9, 2011 in counterpart European Application No. 06770036.9.

* cited by examiner

*Primary Examiner* — Andrew Caldwell
*Assistant Examiner* — Bryan Lee

(57) ABSTRACT

Embodiments of a system and method for distributing network data to multiple nodes in a data communications network is described. Two data communication channels are provided for each node in the network. While one of the communication channels carries routing and flow control protocol messages, as well as data, in both directions between network nodes, the other communication channel is configured to transmit data traffic—and only data traffic—in a single direction from the network data server toward all of the other nodes in the network. By using 100% of the available bandwidth for data traffic only, the speed at which data may be distributed throughout the network is maximized and the performance degradation caused by the congestion, collisions or packet loss that typically occurs in two-way data communication channels is avoided.

17 Claims, 3 Drawing Sheets

NETWORK DATA DISTRIBUTION SYSTEM AND METHOD

BACKGROUND INFORMATION

Data communications networks are typically comprised of a set of nodes (e.g., computers, routers and/or switches) connected by a set of two-way data communications links (e.g., wires, cable, fiber, microwave or radio wave channels, etc.). In a data communications network, a node is a connection point, either a redistribution point or an end point, for data transmissions. In existing data communications networks, each node in the network (especially if the node is a switch or router) typically requires a programmed or engineered capability to recognize, process and/or forward data traffic to other nodes in the network according to various network routing and flow control protocols designed to allow sharing the bandwidth available in each interface link in the network as data travels in both directions across that interface link.

In a two-way data communications network, routing protocols are used by a device or, in some cases, by software in a computer, to determine the next connection point to which a packet of data should be forwarded toward its final destination. A hardware or software "router," which is typically connected to at least two two-way interface links, determines which way to send each data packet based on its current understanding of the status (e.g., bandwidth available, congestion level, collision potential, etc.) of the links to which it is connected. Thus, routers use routing protocols to determine the route for a data flow and, more specifically, to which adjacent connection points in a network each data packet in the data flow should be sent. A router is often included as part of a network "switch," which is also a network device that selects a path or circuit for sending a packet of data to its next destination.

"Flow control" is the management of data flow between computers or devices or between nodes in a data communications network so that the data is transmitted at an optimum rate and in a preferred order. Too much data arriving before a device or interface link can handle it can cause congestion, collisions and/or queue overflow conditions, the result of which can be that some of the data is either lost or must be retransmitted. In existing data communications networks, flow control protocols are necessary in order to slow down or cease data transmissions across a congested two-way network interface link until the congestion in the two-way interface link eases.

When routing and flow control protocols are used in a data communications network to manage and control data traffic moving in both directions over two-way links (also called "channels"), a significant amount of bandwidth in each two-way data communication channel must be consumed by the many routing and flow control messages that must be moved from node to node around the data communications network along with the actual data. When there is a very large number of nodes in the network, or when there is a sizable number of data requests that must be processed and put through the network, the degradation in actual data transmission speeds resulting from the fact that significant amounts of bandwidth are being used to exchange routing and flow control protocol messages can become unacceptably high.

Accordingly, there is a need for a network data distribution system that maximizes the speed at which actual data may be retrieved and distributed throughout the network. There is a further need for network data distribution systems and methods that use 100% of the available bandwidth in a data communications channel for transmitting actual data. There is still a further need for systems and methods that achieve maximum data transmission speeds without having to account for or worry about congestion, collisions or packet loss in each link.

BRIEF DESCRIPTION OF THE DRAWINGS

The following detailed description will be best understood in conjunction with the attached drawings, which are incorporated in and constitute part of the specification.

DETAILED DESCRIPTION OF PREFERRED EMBODIMENTS

Figure 1:
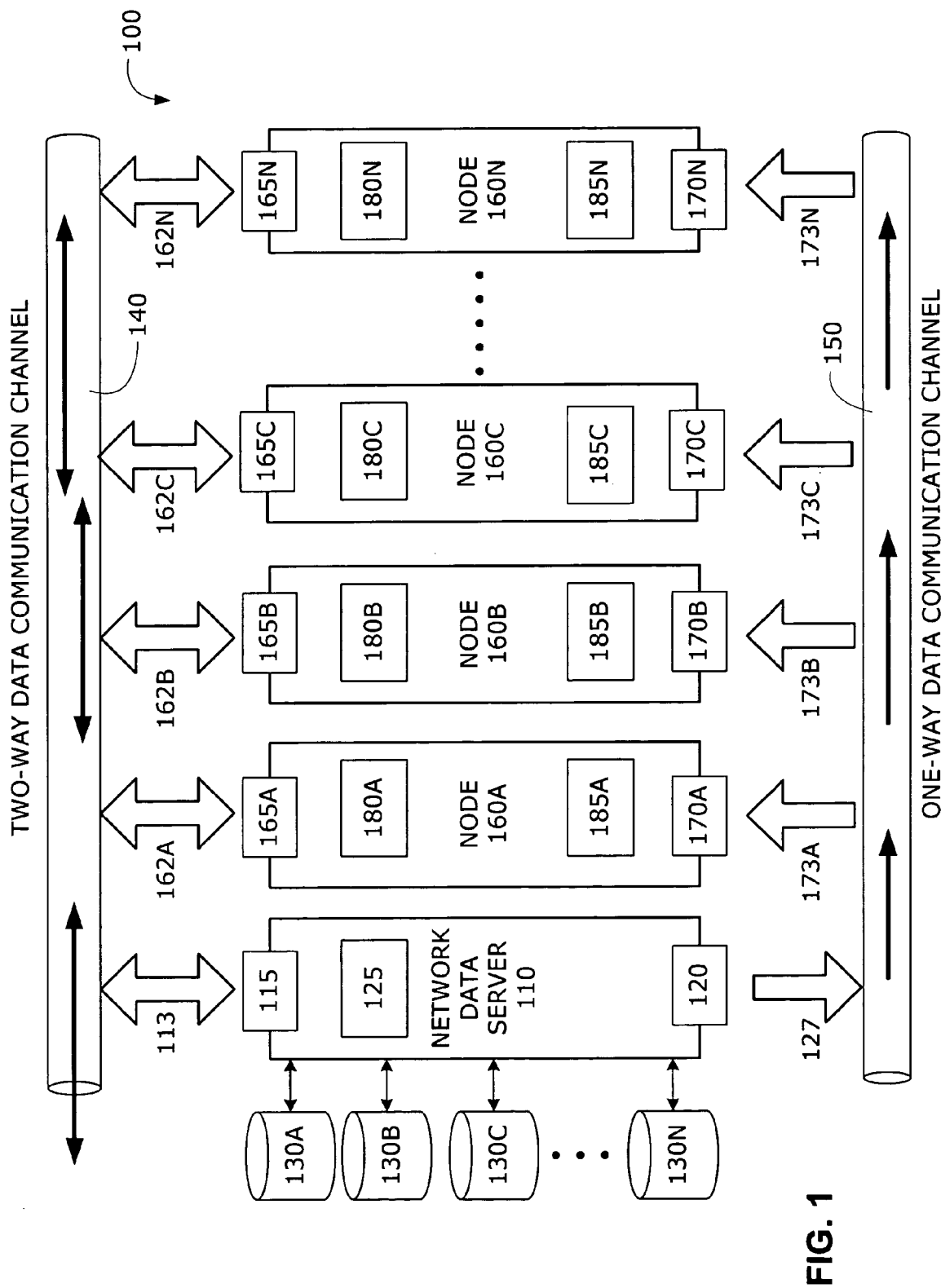
FIG. 1 depicts a high-level block diagram illustrating an arrangement of some of the physical components in a network data distribution system configured to operate according to an embodiment of the present invention.

Reference will now be made in detail to preferred embodiments according to the present invention(s), examples of which are illustrated in the drawings. Notably, the present invention(s) may be implemented using software, hardware, or any combination thereof, as would be apparent to those of ordinary skill in the art. Therefore, the figures and examples below are not meant to limit the scope of the present invention or its embodiments or equivalents.

Systems and methods implemented in accordance with the present invention may facilitate operation of a network database. In the preferred embodiments according to the present invention, a plurality of nodes are connected via two network connections. A first one of the networks is considered the existing network for communication between the nodes, and the second network is added for data only traffic between the nodes. This dual network connection configuration forms a network database, for example. The data (second) network handles data broadcasts from, for example, a node designated a data server, to all nodes in the network in a unidirectional (one-way) mode. The terms "broadcast" is used herein to mean that data packets transmits along the network connection (e.g., bus) and may or may not have a specific destination node; nodes monitor the connection and acquire only the data packets that they have an interest in. This interest may be predetermined or specified by information in the data packet.

The traffic back to the data server always travels on the first network. This configuration enables the data network to push data to nodes that have a need for the data and consume all of the available bandwidth on the data network. One-way traffic avoids the network congestion likely to exist on the first network, which handles bidirectional traffic between the nodes.

The multi-network multi-node configuration according to one implementation of the present invention facilitates data replication between data servers (e.g., multiple nodes), thereby forming the backbone for a disaster recovery plan for data. Partitioning data transmission between two networks, one of which handling one-way traffic and the second handling two-way traffic, enables fast, reliable distribution of data among the network nodes. This way a data store may be distributed among the network nodes using known distribution and redundancy techniques, and in the event of a node failure or problem accessing a particular node, the data on that node may be recovered from a node designated by the particular distribution and redundancy technique employed as a backup for the problem node. Using the multi-network multi-node configuration according to one implementation of the present invention, users have a higher confidence that the backup node contains a complete and accurate image of the data in the problem node because the data located in the node travels to the backup node, from the problem node or some other node in the network where it originates, using the higher transmission speed afforded by the data network.

FIG. 1 depicts a high-level block diagram illustrating an arrangement of some of the physical components in a network data distribution system configured to operate according to an embodiment of the present invention. As shown in FIG. 1, a network data distribution system 100 configured to operate according to a preferred embodiment of the present invention comprises a two-way data communication channel 140, a one-way data communication channel 150, which are both coupled to a network data server 110 and to each node in a plurality of network nodes (shown in FIG. 1 as nodes 160A, 160B, 160C through 160N) in the network. Two-way data communication channel 140 is configured to carry actual data, as well as routing and flow control messages, in both directions, back and forth from one node to another node connected to the channel, including the network data server 110. One-way data communication channel 150, on the other hand, is configured to carry nothing but actual data (i.e., no protocol messages will be transmitted on the one-way channel), and only in one direction, namely away from network data server 110 and toward nodes 160A through 160N.

Two-way data communication channel 140 may be constructed, for example, using wire or cable (e.g., Ethernet cable), fiber optics, a phone line (e.g., over the PSTN), a cellular phone link, an RF link and other communications technology. One-way data communication channel 150 may be constructed from the same kind of communications devices, but it may also be advantageous, depending on the application, to use cable television wire technology, since cable television wire technology is very mature and particularly well suited for transferring data in a single downstream direction to all other nodes in the network.

Network data server 110 includes a network interface adapter 115, which provides a connection to the two-way data communication channel 140 via two-way communications link 113. Network data server 110 also includes a second network interface adapter 120, which provides a one-way connection to one-way data communication channel 150 via one-way communications link 127. Links 113 and 127 may or may not be implemented using the same communication devices used to implement two-way data communication channel 140 and one-way data communication channel 150.

As shown in the embodiment depicted in FIG. 1, network data server 110 also includes a data request processor 125, which is configured to receive and process data requests generated by nodes 160A through 160N and transmitted to network data server 110 over two-way data communication channel 140, communications link 113 and network interface adapter 115. In preferred embodiments, data request processor 125 carries out the processing by accessing one or more data stores (designated 130A, 130B, 130C . . . 130N in FIG. 1), which are coupled to or incorporated within network data server 110. Preferably, although not necessarily, network data server 110 is configured (using high-speed caching technology, for example) to move and/or copy large volumes of data, under the control of data request processor 125, from the actual data stores 130A through 130N (such as, for example, disk drives) to one-way data communication channel 150 at very high speeds.

In some embodiments, nodes 160A through 160N each contain a network interface adapter (shown in FIG. 1 as 165A through 165N), which couples each node 160A through 160N to two-way data communication channel 140 via two-way communications links 162A, 162B, 162C through 162N, respectively. Each node 160A through 160N also contains a second network interface adapter (shown in FIG. 1 as 170A through 170N), which couple nodes 160A through 160N to one-way data communication channel 150 via one-way communications links 173A, 173B, 173C through 173N, respectively. Each node 160A through 160N may also include data processors (designated 180A, 180B, 180C through 180N in FIG. 1), which may comprise operating system or user-level application programs configured to generate the data requests that are sent to network data server 110 over two-way data communication channel 140. Each data request may comprise a request to receive, update, modify, delete or move data stored on data stores 130A through 130N, or some combination of two or more of these operations.

Data modifications may take place on any of the nodes 160A through 160N. Suppose, for example, that a node in the network learns that a customer "A" has just made a $100 charge to his account. The information about the charge would flow to network data server 110 over the 2-way data channel 140. Then, if node 160N is used to create a new monthly billing statement for customer A, it will retrieve the current data concerning customer A's account (i.e., the $100 charge, as well as the current balance) from network data server 110 over one-way channel 150, so it can produce the correct bill.

One-way communications links 173A, 173B, 173C through 173N, as well as network interface adapters 170A through 170N, are optimally configured to operate under the control of data processors 180A, 180B, 180C through 180N, to move data in only one direction, namely from one-way data communication channel 150 and into memory storage areas (185A, 185B, 185C through 185N), where the data may then be accessed by any applications running on those nodes. Data processors 180A through 180N are also configured to identify and capture data traversing one-way data communication channel 150, which is responsive to the generated data request and to ignore all data traversing one-way data communication channel 150 which is not responsive to a pending data request.

Figure 2:
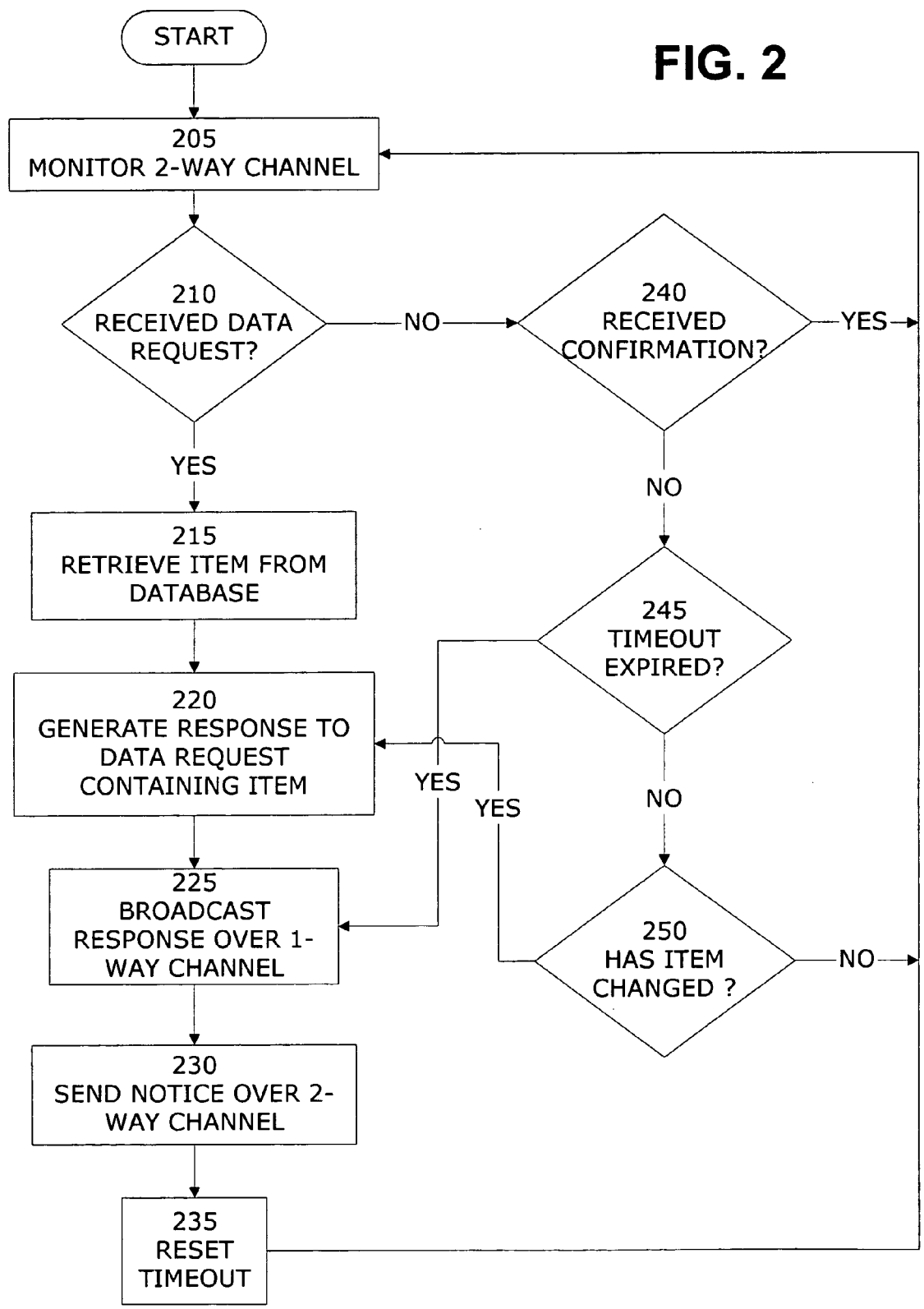
FIG. 2 depicts a high-level flow diagram illustrating an example of an algorithm that might be performed by a network data distribution system according to embodiments of the present invention.

FIG. 2 depicts a high-level flow diagram illustrating an example of an algorithm that might be performed by a network data distribution system, such as the one described above with reference to FIG. 1, according to embodiments of the present invention. Beginning with step 205, network data server 110 may be configured to continuously monitor two-way data communication channel 140 in order to determine whether a data request has been received (the test is shown at step 210 in FIG. 2). As described below, and as shown at step 240 in FIG. 2, network data server 110 also determines whether a confirmation associated with an earlier data request has been received. Preferably, the system continues to check the two-way channel (shown as the flow control loop consisting of steps 205, 210 and 240) until either a new data request or a confirmation is received.

Returning to step 210, if a data request is received, the system, at step 215, retrieves the requested data item from one or more data stores (130A through 130N in FIG. 1) attached to network data server 110. Preferably, the data retrieval occurs very rapidly under the control of a data request processor (designated 125 in FIG. 1), which generates a response to the data request containing the requested data item (step 220). Next, at step 225, the network data server broadcasts the response to all of the nodes in the network over the one-way data communication channel. Preferably, although not necessarily, the system then sends a notification to the appropriate node over the two-way data communication channel, said notification indicating that the requested data is being, will be, or has been, broadcasted over the high-speed one-way data communication channel (see step 230). Next, at step 235, the system resets a timeout counter, which determines when the system will re-broadcast the response. At this point, control passes back to step 205, where the system again monitors the two-way data communication channel until a data request or confirmation is received (depicted as the control loop consisting of steps 205, 210 and 240).

At step 240, the system tests incoming data on the two-way data communication channel to determine whether a confirmation associated with an earlier-broadcasted response has been received. The confirmation serves as an indication to the network data server that the network node that generated a data request has received the response over the one-way data communication channel. If the answer is yes, the system returns to step 205 and continues to monitor the two-way data communication channel. If, on the other hand, the answer is no, the system first determines, at step 245, whether the timeout has expired. If the timeout has expired, then control passes again to step 225, where the response is re-broadcasted to all nodes on the network. If the timeout has not expired, then the system determines whether the data item has changed, step 250. Such change might occur, for example, when another program, another node or process, modifies or updates the data item, or when the retrieval of the item by the network data server requires a modification to the item. If the data item has been changed, then control passes again to step 220, where a new response is generated and then, in step 225, broadcasted over the one-way data communication channel. If, however, the data item has not changed, then control passes back to step 205, where the system continues to monitor the two-way data communication channel until the timeout does expire, a new data request or confirmation is received, or the data item is changed.

Figure 3:
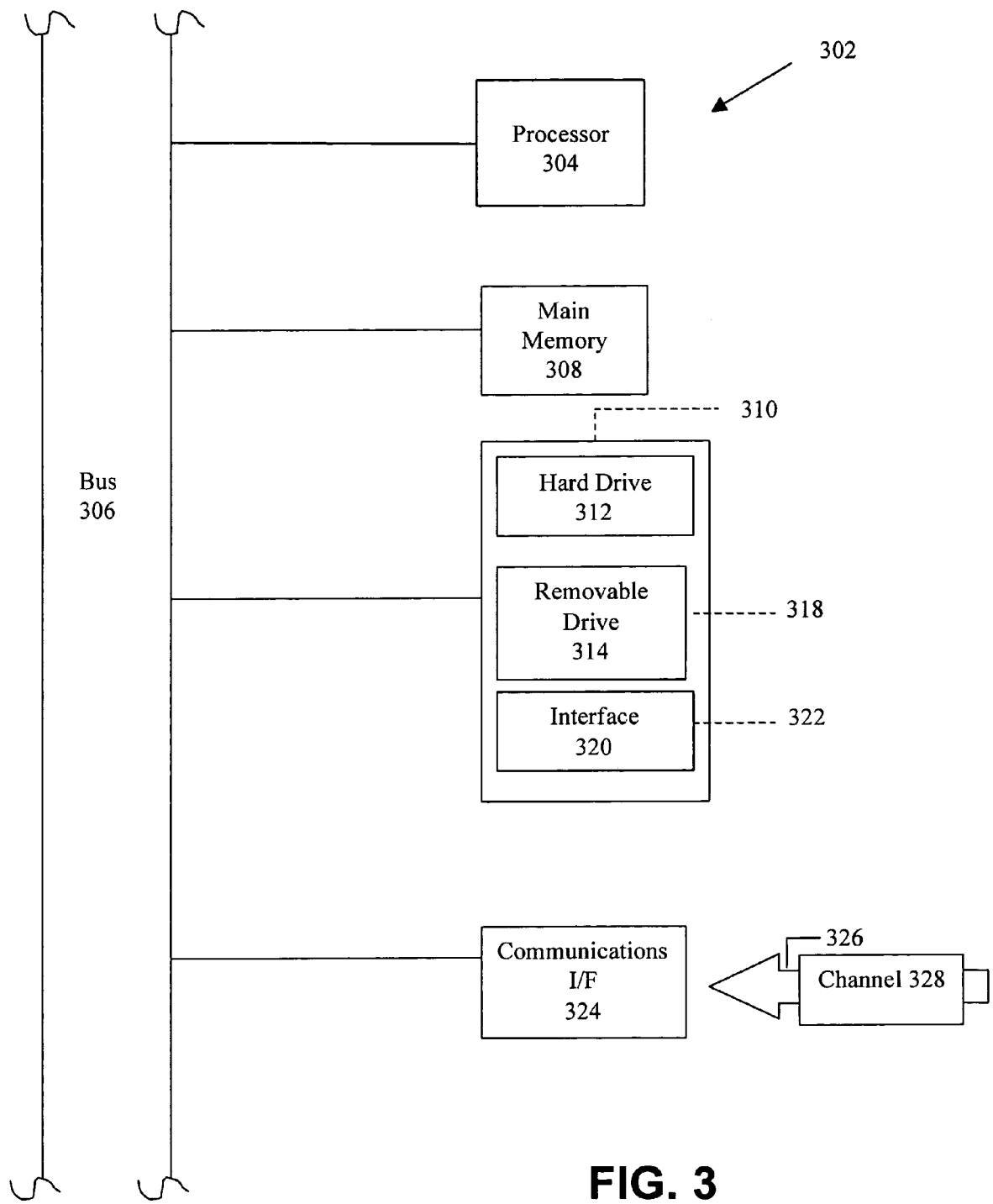
FIG. 3 is a block diagram of a computer system that may be used to implement a network data server or a network node in an embodiment of the present invention.

FIG. 3 is a block diagram of a computer system that may be used to implement a network data server or a network node in an embodiment of the present invention. The computer system 302 includes one or more processors, such as a processor 304. The processor 304 is connected to a communication bus 306. Various software embodiments are described in terms of this exemplary computer system. After reading this description, it will become apparent to a person skilled in the relevant art how to implement the invention using other computer systems and/or computer architectures.

The computer system 302 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. The removable storage unit 318, represents a floppy disk, magnetic tape, optical disk, etc. which is read by and written to by the removable storage drive 314. As will be appreciated, the removable storage unit 318 includes a computer usable storage medium having stored therein computer software and/or data.

In alternative embodiments, the secondary memory 310 may include other similar means for allowing computer programs or other instructions to be loaded into the computer system 302. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320, which allow software and data to be transferred from the removable storage unit 322 to the computer system 302.

The computer system 302 can also include a communications interface 324. The communications interface 324 allows software and data to be transferred between the computer system 302 and external devices. Examples of the communications interface 324 can include a modem, a network interface adapter (such as an Ethernet card), a communications port, a PCMCIA slot and card, etc. Software and data transferred via the communications interface 324 are in the form of signals 326 that can be electronic, electromagnetic, optical or other signals capable of being received by the communications interface 324. Signals 326 are provided to communications interface via a channel 328, which can be implemented using wire or cable, fiber optics, a phone line, a cellular phone link, an RF link and other communications channels.

In this document, the term "computer-readable storage medium" is used to generally refer to media such as the removable storage device 318, a hard disk installed in hard disk drive 312, and signals 326. These media are means for providing software and operating instructions to the computer system 302.

Computer programs (also called computer control logic) are stored in the main memory 308 and/or the secondary memory 310. Computer programs can also be received via the communications interface 324. Such computer programs, when executed, enable the computer system 302 (e.g., through processor 304) to implement the systems and methods that include the present invention.

In an embodiment where the invention is implemented using software, the software may be stored in a computer-readable storage medium and loaded into the computer system 302 using the removable storage drive 314, the hard drive 312 or the communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of a hardware state machine that implements the embodiments described herein will be apparent to persons skilled in the relevant art(s). In yet another embodiment, the invention is implemented using a combination of both hardware and software.

The above-described embodiments are by no means meant to limit the scope of the invention. Though preferred embodiments according to the present invention have been described herein, many variations and modifications will become apparent to those skilled in the art upon reading this disclosure and the following claims, as well as practicing the claimed inventions. It is therefore the intention that the claims be interpreted as broadly as possible in view of the prior art, to include all such variations and modifications.

What is claimed is:

1. A network data distribution system, comprising:
a one-way data communication channel;
a two-way data communication channel;

a plurality of network nodes, each coupled to the one-way data communication channel and to the two-way data communication channel; and a network data server configured:
to receive a data request from one network node in the plurality of network nodes via the two-way data communication channel,
to retrieve a data item responsive to the data request,
to transmit a response to the data request over the one-way data communication channel, the response including the data item, and
to transmit a notice to the one network node, via the two-way data communication channel, indicating that the response has been transmitted on the one-way data communication channel.

2. The network data distribution system of claim 1, wherein the at least one network node in the plurality of network nodes further comprises:
a memory storage area; and
a processor;
wherein the processor is configured:
to transmit the data request over the two-way data communication channel via a second network interface adapter,
to identify the response within the data traffic traversing the one-way data communication channel, and
to store a copy of the response in the memory storage area.

3. The network data distribution system of claim 2, wherein the processor is further configured to transmit a confirmation to the network data server via the two-way data communication channel.

4. The network data distribution system of claim 1, wherein the network data server is further configured to re-transmit the response via the one-way data communication channel upon expiration of a specified time period.

5. The network data distribution system of claim 1, wherein the network data server is further configured to modify the item responsive to a modification request received from one of the plurality of network nodes via the two-way data communication channel.

6. A method of distributing data in a data communications network having a plurality of nodes, each of the plurality being coupled to a one-way data communication channel and to a two-way data communication channel, comprising:
receiving a data request from one network node in the plurality of network nodes via the two-way data communication channel;
broadcasting a response to the data request over the one-way data communication channel; and
notifying the one network node, via the two-way data communication channel, that the response has been broadcasted on the one-way data communication channel.

7. The method of claim 6, further comprising:
monitoring broadcast traffic traversing the one-way data communication channel at the one network node;
identifying the response within the broadcast traffic;
capturing a copy of the response; and
storing the copy in a memory storage area.

8. The method of claim 7, further comprising:
sending a confirmation, responsive to the storing step, to a network data server via the two-way data communication channel.

9. The method of claim 6, further comprising:
re-broadcasting the response via the one-way data communication channel upon expiration of a specified time period.

10. The method of claim 6, further comprising:
retrieving an item from a database prior to broadcasting the response; and
modifying the item responsive to the data request.

11. The method of claim 10, further comprising:
re-broadcasting the response via the one-way data communication channel responsive to the modification of the item 12. The method of claim 6, further comprising:
retrieving an item from a database prior to broadcasting the response;
receiving a modification request from one of the plurality of network nodes via the two-way data communication channel; and
modifying the item responsive to the modification request.

13. A network data server, comprising:
a first network interface, coupled to a one-way data communication channel;
a second network interface, coupled to a two-way data communication channel; and
a processor coupled to the first network interface and the second network interface, the processor configured to:
receive a data request from one network node in a set of network nodes connected to the two-way data communication channel and the one-way data communication channel,
generate a response to the data request,
broadcast the response over the one-way data communication channel, and
transmit a notice to the network node, via the two-way data communication channel, indicating that the response has been broadcasted on the one-way data communication channel.

14. The network data server of claim 13, wherein the processor is further configured to re-broadcast the response via the one-way data communication channel upon expiration of a specified time period.

15. The network data server of claim 13, wherein the processor is further configured to retrieve an item from a database prior to generating the response and to modify the item responsive to the data request.

16. The network data server of claim 15, wherein the processor is further configured to receive a modification request from a network node in the set of network nodes via the two-way data communication channel.

17. The network data server of claim 16, wherein the processor is further configured to re-broadcast the response via the one-way data communication channel responsive to the modification request.

* * * * *